United States Patent
Adelmann

(10) Patent No.: US 7,698,502 B2
(45) Date of Patent: Apr. 13, 2010

(54) FILE RECOVERY SYSTEM FOR A REMOVABLE PORTABLE MEMORY DEVICE

(75) Inventor: Todd Christopher Adelmann, Boise, ID (US)

(73) Assignee: Seagate Technology LLC, Scotts Valley, CA (US)

(*) Notice: Subject to any disclaimer, the term of this patent is extended or adjusted under 35 U.S.C. 154(b) by 1231 days.

(21) Appl. No.: 10/200,970

(22) Filed: Jul. 24, 2002

(65) Prior Publication Data
US 2004/0019759 A1 Jan. 29, 2004

(51) Int. Cl.
*G06F 12/00* (2006.01)
(52) U.S. Cl. .................. 711/115; 711/4; 711/100; 711/102; 711/103; 711/111; 711/112; 711/163; 711/173
(58) Field of Classification Search .......... 711/4, 711/100, 109, 154, 173, 102–103, 115, 111–112, 711/163; 714/100, 2, 15–16; 365/218
See application file for complete search history.

(56) References Cited

U.S. PATENT DOCUMENTS

| | | | | |
|---|---|---|---|---|
| 3,742,458 A * | 6/1973 | Inoue et al. | | 711/154 |
| 4,887,234 A * | 12/1989 | Iijima | | 711/173 |
| 5,548,741 A * | 8/1996 | Watanabe | | 711/115 |
| 5,630,044 A * | 5/1997 | Suzuki | | 714/5 |
| 5,802,551 A * | 9/1998 | Komatsu et al. | | 711/103 |
| 6,044,443 A * | 3/2000 | Kim | | 711/154 |
| 6,345,318 B1 * | 2/2002 | Gamon | | 710/8 |
| 6,374,268 B1 * | 4/2002 | Testardi | | 707/205 |
| 6,570,911 B1 * | 5/2003 | O'Mahony | | 375/222 |
| 6,609,186 B1 * | 8/2003 | Veres et al. | | 711/171 |
| 6,611,836 B2 * | 8/2003 | Davis et al. | | 707/10 |
| 6,675,276 B2 * | 1/2004 | Schulze et al. | | 711/200 |
| 6,735,680 B2 * | 5/2004 | Ahmad | | 711/173 |
| 6,763,440 B1 * | 7/2004 | Traversat et al. | | 711/159 |
| 6,788,604 B2 * | 9/2004 | Yokota et al. | | 365/218 |
| 6,795,637 B1 * | 9/2004 | Moon et al. | | 386/46 |
| 6,809,964 B2 * | 10/2004 | Moschopoulos et al. | | 365/185.11 |
| 2002/0063783 A1 * | 5/2002 | Kurase | | 348/232 |
| 2002/0089543 A1 * | 7/2002 | Ostergaard et al. | | 345/764 |
| 2004/0105018 A1 * | 6/2004 | Takahashi et al. | | 348/231.2 |

FOREIGN PATENT DOCUMENTS

| | | | | |
|---|---|---|---|---|
| JP | 11085577 | A | * | 3/1999 |
| JP | 11085577 | A | * | 3/1999 |
| JP | 2004214954 | A | * | 7/2004 |

* cited by examiner

*Primary Examiner*—Tuan V Thai
*Assistant Examiner*—Zhuo H Li
(74) *Attorney, Agent, or Firm*—Fellers, Snider, et al.

(57) ABSTRACT

A removable semiconductor memory card for a portable appliance is provided comprising a memory with a portion thereof dedicated to deleted files, and a memory card controller that operates to recognize a memory delete command associated with a specific file, and to shift the specific file to the deleted files portion of the memory.

24 Claims, 4 Drawing Sheets

FILE RECOVERY SYSTEM FOR A REMOVABLE PORTABLE MEMORY DEVICE

FIELD OF THE INVENTION

The present invention relates generally to the field of memory devices, and more particularly, to a memory card for a portable appliance.

BACKGROUND OF THE INVENTION

Memory cards for portable appliances do not allow for the recovery of erased files. Any recovery of erased files must be implemented through a function associated with the operating system of the appliance itself. For example, most PCs have the capability for the recovery of erased files through a recycle bin. However, for memory cards for non-PC appliances, such as cameras, for example, where the memory card may be moved from appliance to appliance, this capability is lost.

SUMMARY OF THE INVENTION

In one embodiment of the present invention, a portable memory card is provided for a non-PC portable appliance, comprising the following elements on the card: a memory with a portion thereof dedicated to deleted files; and a memory card controller that operates to recognize a memory delete command associated with a specific file, and to shift the specific file to the deleted files portion of the memory.

In a further embodiment of the present invention, a method is provided for use in a memory card controller for controlling a portion of the memory card dedicated to deleted files, comprising: recognizing a memory delete command associated with a specified file; and shifting the file to the deleted files portion of the memory.

In a yet further embodiment of the present invention, a program product is provided for use in a memory card controller for controlling a portion of the memory card dedicated to deleted files, comprising machine readable program code for causing a machine to perform the following steps: recognizing a memory delete command associated with a specified file; and shifting the file to the deleted files portion of the memory.

DETAILED DESCRIPTION OF THE PREFERRED EMBODIMENTS

Figure 1:
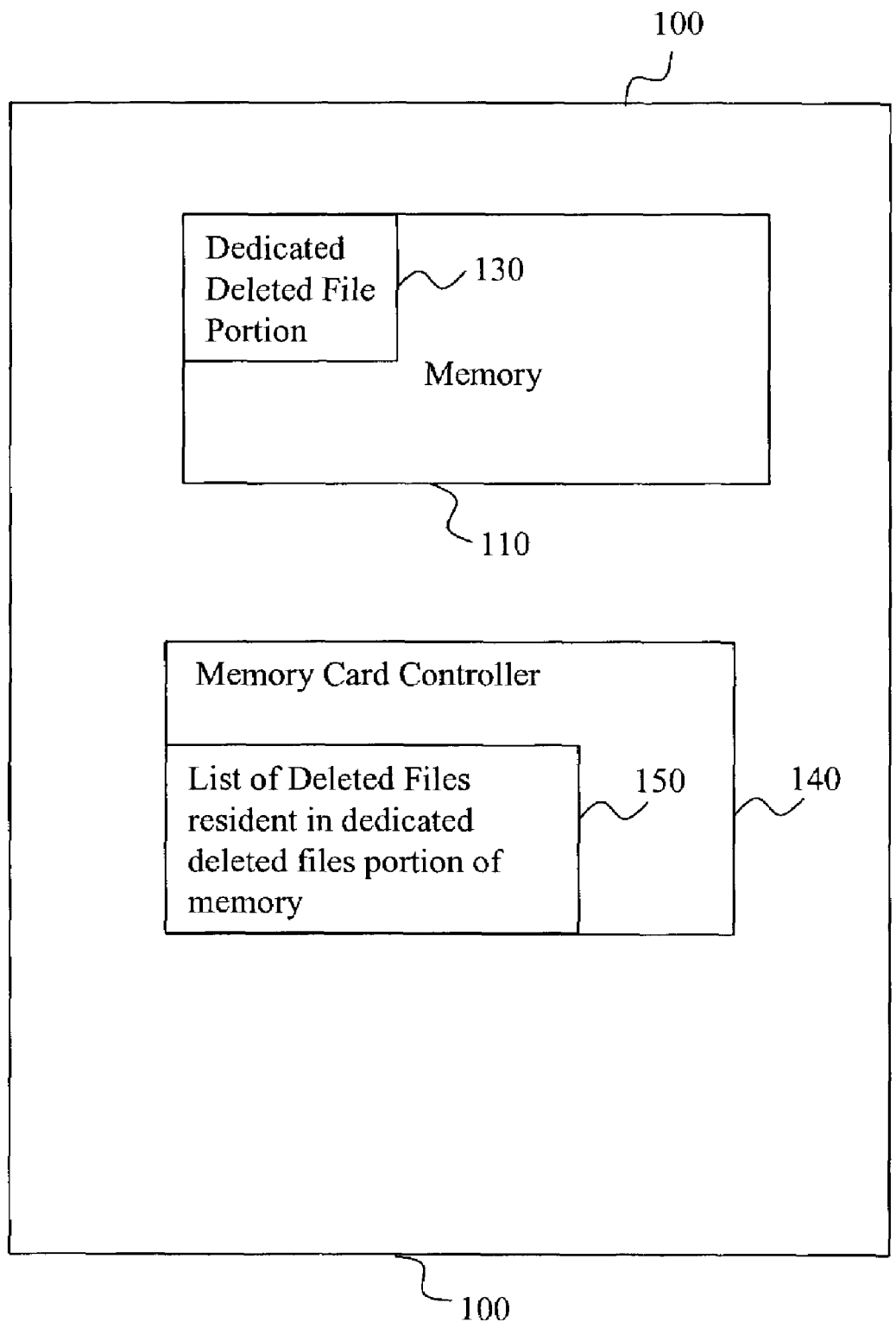
FIG. 1 is a schematic block diagram of one embodiment of the present invention.

Referring now to FIG. 1, there is shown a portable memory card for a non-PC portable appliance 100. The portable memory card 100 comprises a memory portion 110, with a portion 130 thereof dedicated to deleted files. The memory card 100 further includes a memory card controller 140. The memory card controller includes code or hard wired circuitry and/or a combination thereof to recognize a memory delete command associated with a specific file, and to shift the specific file to the deleted files portion 130 of the memory 110.

The memory card 100 may take a variety of different configurations in shapes. Generally, the configuration and shape of the memory card will be dependent on the particular appliance with which it is to be used. The memory 110 for the card 100 may be implemented by any convenient set or matrix of storage elements, including electronic storage, magnetic storage, or optical storage. The memory card controller 140 may be implemented in an embodiment by means of a processor formed on or disposed on the memory card either in a separate chip or in the same chip as the memory 110. The memory card controller 140 may implement one or a plurality of the normal functions required of a memory controller, such as sending timing signals, storage signals and other required signals. Alternatively, the memory card controller 140 can be dedicated simply to an erased file function in accordance with the present invention.

Figure 2:
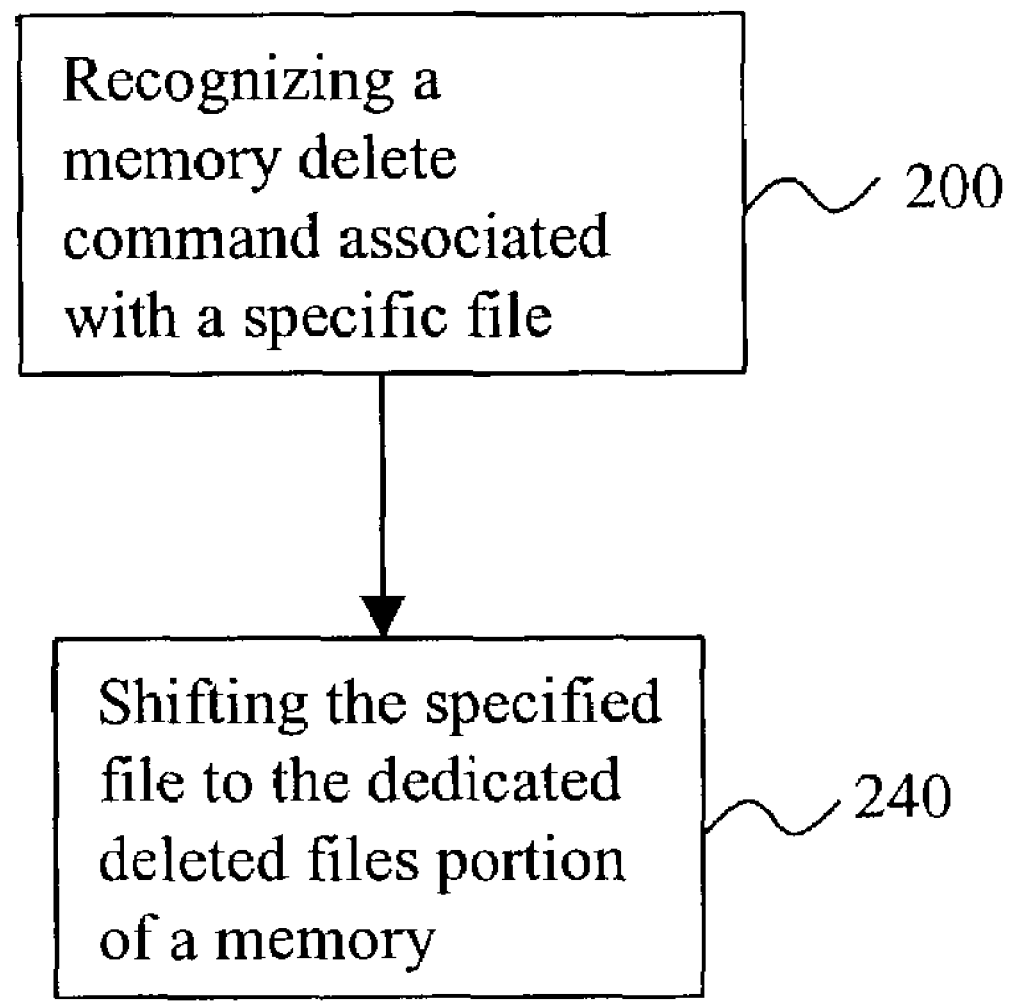
FIG. 2 is a schematic block diagram of a flowchart of an embodiment of the present invention.

An embodiment of an operating sequence for the memory card controller 140 is shown in FIG. 2. The logic illustrated by FIG. 2 may be implemented either by means of hard wire circuitry, or by means of programming, and/or by a combination thereof. Referring to FIG. 2, the first operation represented by block 200 is to recognize a memory delete command associated with a specific file. In a most elemental embodiment of the present invention, the next operation comprises shifting the specified file 240 to the dedicated deleted file portion of the memory 130.

Figure 3:
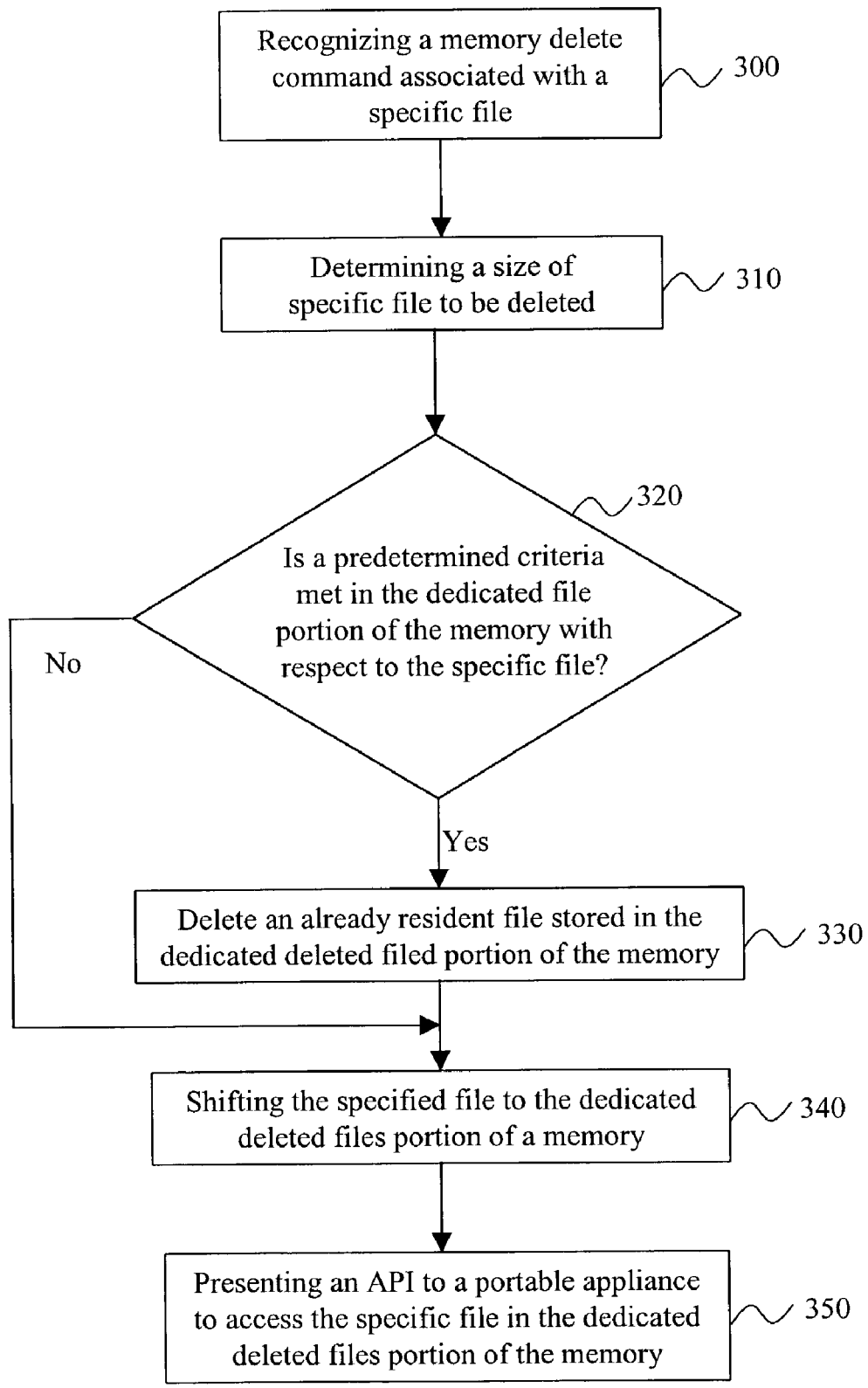
FIG. 3 is a schematic block diagram of a flowchart of an embodiment of the present invention.

A further embodiment of the present invention is shown is FIG. 3. The first block 300 comprises recognizing a memory delete command associated with a specific file. Block 310 is then provided for determining a size of the specific file to be deleted.

Referring to block 320, it is then determined whether a predetermined criteria is met in the dedicated file portion 130 of the memory 110 with respect to the specific file. In one implementation of this block, the predetermined criteria may comprise whether the file size of the specified file exceeds a remaining memory capacity in the deleted files portion 130 of the memory 110.

Referring to block 330, if the predetermined criteria has been met, then an already resident file stored in the deleted files portion of the memory is deleted. There are a variety of different criteria which may be utilized to select which resident file or files should be deleted from the deleted files portion of the memory. By way of example, but not by way of limitation, a criteria which may be utilized is a first-in-first-out principle. Using this FIFO principle, the oldest resident file would automatically be selected for deletion from the deleted files portion of the memory 130. Alternatively, various other criteria may be utilized to select the resident file to be deleted in the deleted files portion of 130 of the memory. Such other criteria may include the file sizes of the already resident files. In this regard, it may be more advantageous to delete a single large file, rather than a plurality of smaller resident files from the deleted files portion of the memory. Another method of selecting the resident file in the dedicated deleted files portion of the memory to be deleted may be by means of sorting the resident files based on their source. Alternatively, various other selection criteria or means of sorting the already resident files in the deleted files portion 130 of the memory may be used to select the resident file or files to be deleted.

Referring now to block 340, the specified file is then shifted/stored in the dedicated deleted file portion 130 of the memory 110. Note that block 330 would be bypassed if the predetermined criteria of block 320 was not met.

In order to access the dedicated deleted files portion 130 of the memory 110, a variety of options are available. By way of example but not by way of limitation, the memory card could be placed into a drive or other receiving mechanism for a PC. Such a drive could be especially adapted for receiving such a portable memory card, or an adapter could be utilized in order to allow the memory card to be placed in the drive. Access of the dedicated deleted files portion of the memory could be accomplished, by way of example but not by way of limitation, by using a "directory" command or by other convenient access command.

Referring now to block 350, there are certain instances where it is desirable for access to the dedicated deleted files portion 130 of the memory 130 to be available via a non-PC portable appliance. Such non-PC portable appliances may already include a method for accessing the dedicated deleted files portion 130 of the memory. However, in instances where the non-PC portable appliance does not include such a method, it is desirable to add an application program interface (API) to the appliance in order to allow access to the deleted files portion of the memory. This addition of the API is represented by block 350.

Figure 4:
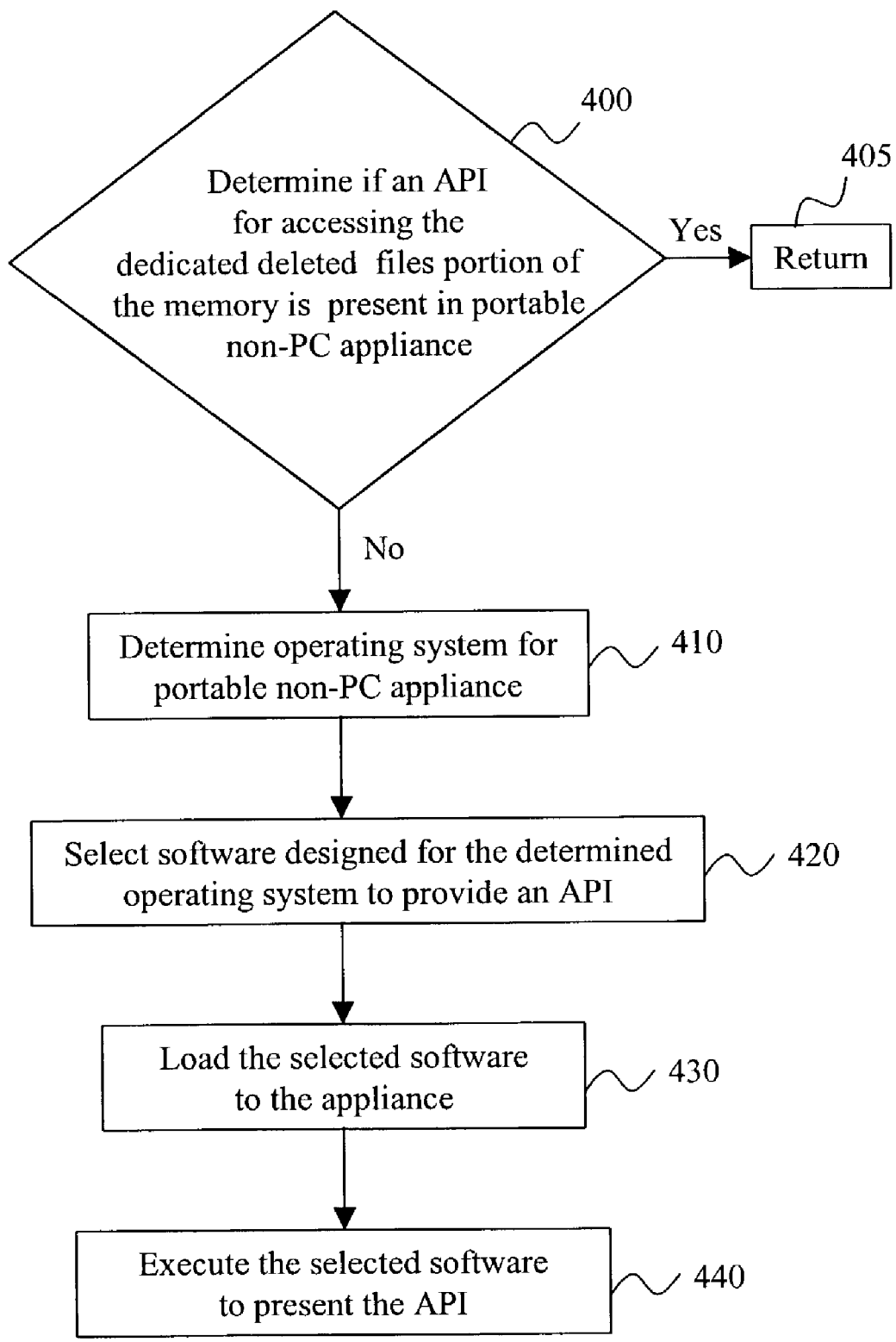
FIG. 4 is a schematic block diagram of a flowchart for providing an API to a portable non-PC appliance.

An example implementation of block 350 is shown in FIG. 4. Referring to FIG. 4, block 400 comprises determining if an API for accessing the dedicated deleted files portion of the memory is present in the portable non-PC appliance. If the determination is YES, then the operation moves to block 405 to return. Alternatively, if it is determined that there is no API for accessing the dedicated deleted files portion of the memory in the portable non-PC appliance, then the operation moves to block 410. Block 410 comprises determining the operating system for the portable non-PC appliance.

Referring now to block 420, software residing in the memory controller is selected from one or a plurality of software APIs designed for various different operating systems to provide an API to that portable non-PC appliance.

Referring to block 430, the selected software is loaded to the appliance. In block 440, the selected software is executed to present the API for the portable non-PC appliance. Note that the selected software may conveniently add an icon or menu to the operating system for the appliance to allow access by the user to this dedicated deleted files portion of the memory. By way of example but not by way of limitation, clicking on the icon might bring up a listing of the deleted files. Clicking on any one of the files in the list would move that file from the dedicated deleted files portion of the memory 130 to the normal storage area for files in the memory. For reference, the normal storage area is also referred to herein as a "first portion" of the memory 110, and the dedicated deleted files portion 130 is also referred to herein as a "second portion" of the memory 110.

Accordingly, in one embodiment of the present invention, the portable memory card may further comprise a storage thereon containing a listing of deleted files resident in the portion of the memory dedicated to deleted files.

In another embodiment of the present invention, the memory card controller may comprise a storage thereon containing a listing of deleted files resident in the portion of the memory dedicated to deleted files.

In another embodiment of the present invention, the memory card controller determines a file size for the specific file associated with the delete command, and deletes an already resident file stored in the dedicated file portion of the memory if a predetermined criteria is met in the deleted files portion of the memory.

In another embodiment of the present invention, the memory card controller moves files into and out of the deleted files portion of the memory on a first-in-first-out basis.

In another embodiment of the present invention, the memory card controller selects files to delete from the dedicated deleted files portion of the memory by a file sort based on source.

In another embodiment of the present invention, the memory card controller presents an API to the portable appliance to access the deleted files portion of the memory.

In another embodiment of the present invention, the memory card controller operates to determine the operating system of an appliance into which the memory card has been coupled, selects software designed for that operating system from among a plurality of software API programs, loads the selected software into the appliance, and executes the selected program.

The present invention dedicates a special portion of the memory on a portable memory card for deleted files, so that the deleted files can be recovered if accidentally erased. The memory card controller 140 will include therein a listing of deleted files resident in the dedicated deleted files portion of the memory. Alternatively, the memory card controller will have access to a portion of the memory 110 containing this list of deleted files.

By moving deleted files to this special dedicated area of the memory, the user is guaranteed the ability to recover recently erased files, even though the appliance such as a camera, may not have this feature. Accordingly, user unhappiness based on accidental erasure and loss of files, such as pictures, is eliminated. The present invention allows for the recovery of such deleted files even if the portable appliance does not support such recovery. The method and system of the present invention provide assurance that files may be recoverable on the short term as compared to current FAT methods.

The foregoing description of an embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method comprising a step of storing a selecting file in a second portion of a memory of a removable memory card in response to a command issued by a portable non-personal computer (PC) appliance to delete the selected file from a first portion of said memory, wherein the second portion is dedicated to storing deleted files, and wherein the memory is further configured such that the portable non-PC appliance can access the first memory portion but cannot access the second memory portion.

2. The method of claim 1, further comprising a prior step of storing the selected file to the first portion of said memory.

3. The method of claim 1, further comprising a step of re-storing the selected file in the first portion of said memory in response to a subsequent command to restore the selected file.

4. The method of claim 1, wherein the selected file is stored in the first portion as a first set of bits, and wherein the storing step comprises copying the first set of bits to the second portion to provide a second set of bits therein while the first set of bits remains in the first portion, the second set of bits nominally identical to the first set of bits.

5. The method of claim 4, comprising a further step of overwriting said first set of bits in the first portion with a new set of bits stored to the first portion.

6. The method of claim 1, wherein the storing step comprises determining a file size of the selected file and deleting an already resident file stored in the second portion in relation to at least one predetermined criterion.

7. The method of claim 6, wherein the already resident file of the storing step is deleted on a first-in-first-out basis.

8. The method of claim 6, wherein the already resident file of the storing step is deleted on a file sort based on source basis.

9. The method of claim 1, wherein the non-PC appliance is characterized as a first appliance to which said card is initially coupled, and wherein the method further comprises a step of transferring the selected file from the second portion to a second appliance to which said card is coupled after the card is decoupled from the first appliance.

10. The method of claim 9, wherein the transferring step comprises selecting an application program interface (API) from a plurality of said APIs to carry out said transfer in relation to a configuration of the second appliance.

11. The method of claim 1, wherein the first and second portions are characterized as respective portions of a non-volatile semiconductor memory space controlled by a controller of said device.

12. An apparatus comprising a removable memory card comprising a memory with first made second portions, the second portion dedicated to storing deleted files, the card further comprising a controller configured to store a selected file in the second portion in response to a command by a portable appliance in which the card is installed to delete the selected file from the first portion, wherein the memory is further configured such that the portable appliance can access the first portion but cannot access the second portion.

13. The apparatus of claim 12, wherein the controller is further configured to initially store the selected file in the first portion.

14. The apparatus of claim 12, wherein the controller is further configured to re-store the selected file in the first portion of said memory in response to a command to restore the selected file after the command to delete the selected file.

15. The apparatus of claim 12, wherein the selected file is stored in the first portion as a first set of bits, and wherein the controller operates to store the selected file in the second portion by copying said first set of bits to the second portion to form a second set of bits therein while the first set of bits remains in the first portion, the second set of bits nominally identical to the first set of bits.

16. The apparatus of claim 15, wherein the controller is further configured to overwrite said first set of bits in the first portion with a new set of bits stored to the first portion.

17. The apparatus of claim 12, wherein the controller is further configured to maintain a listing of deleted files that are stored the second portion.

18. The apparatus of claim 12, wherein the controller stores the selected file to the second portion by determining a file size of the selected file and deleting an already resident file stored in the second portion in relation to at least one predetermined criterion.

19. The apparatus of claim 18, wherein the already resident file is deleted by the controller on a first-in-first-out basis.

20. The apparatus of claim 19, wherein the already resident file is deleted by the controller on a file sort based on source basis.

21. The apparatus of claim 12, wherein the portable appliance is characterized as a first appliance, and wherein the controller is further configured to transfer the selected file from the second portion to a second portable appliance to which said apparatus is coupled after being decoupled from the first appliance.

22. The apparatus of claim 21, wherein the controller is further configured to select an application program interface (API) from a plurality of said APIs to carry out said transfer in relation to a configuration of the second portable appliance.

23. The apparatus of claim 21, wherein the memory is further configured such that the second appliance can access the second portion.

24. The apparatus of claim 12, wherein the portable appliance is characterized as a non-personal computer (PC) appliance.

* * * * *